(12) United States Patent
Wells et al.

(10) Patent No.: US 11,738,810 B2
(45) Date of Patent: Aug. 29, 2023

(54) POWER TAILGATE CARGO LOAD SENSOR

(71) Applicants: AISIN TECHNICAL CENTER OF AMERICA, INC., Northville, MI (US); TOYOTA MOTOR ENGINEERING & MANUFACTURING NORTH AMERICA, INC., Plano, TX (US)

(72) Inventors: Alexander Wells, Northville, MI (US); Ryan Heins, Northville, MI (US); Eric Archambeau, Northville, MI (US); Takashi Nishio, Northville, MI (US); Norman Kerr, Ann Arbor, MI (US)

(73) Assignees: AISIN TECHNICAL CENTER OF AMERICA, INC., Northville, MI (US); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 92 days.

(21) Appl. No.: 17/452,965

(22) Filed: Oct. 29, 2021

(65) Prior Publication Data

US 2023/0139499 A1 May 4, 2023

(51) Int. Cl.
*B62D 33/027* (2006.01)
*B60R 13/04* (2006.01)
*E05F 15/40* (2015.01)

(52) U.S. Cl.
CPC ............ *B62D 33/0273* (2013.01); *B60R 13/04* (2013.01); *E05F 15/40* (2015.01); *E05Y 2400/52* (2013.01); *E05Y 2900/546* (2013.01)

(58) Field of Classification Search
CPC ...... B62D 33/0273; B62D 33/03; B60R 13/04; B60R 13/043; E05F 15/40; E05F 15/41; E05Y 2400/52; E05Y 2400/54; E05Y 2400/55; E05Y 2900/546

See application file for complete search history.

(56) References Cited

U.S. PATENT DOCUMENTS

| | | | |
|---|---|---|---|
| 9,315,221 B1* | 4/2016 | Anderson | .......... B62D 33/0273 |
| 10,048,113 B2 | 8/2018 | Salter et al. | |
| 10,815,715 B2 | 10/2020 | Salter et al. | |
| 10,815,716 B2 | 10/2020 | Okuma et al. | |
| 11,014,617 B2 | 5/2021 | Meingast et al. | |
| 2013/0099520 A1* | 4/2013 | Tyler et al. | ............ B60R 13/04 296/41 |

(Continued)

FOREIGN PATENT DOCUMENTS

| | | |
|---|---|---|
| DE | 20 2020 104 598 U1 | 8/2020 |
| JP | 2007-46243 A | 2/2007 |

OTHER PUBLICATIONS

U.S. Appl. No. 10/145,164, filed Dec. 4, 2018, Singh et al, withdrawn.

*Primary Examiner* — Gregory A Blankenship
(74) *Attorney, Agent, or Firm* — Oblon, McClelland, Maier & Neustadt, L.L.P.

(57) ABSTRACT

A vehicle tailgate structure of a vehicle is disclosed. The vehicle tailgate structure includes a tailgate located at the rear of the vehicle; a garnish covering a top surface of the tailgate and configured to deform when an external load applies on the garnish, the garnish including a plurality of rib structures along an interior surface of the garnish and a screw portion including the garnish around a screw of the screw portion; and a touch sensor extending along the top surface of the tailgate and covered by the garnish, the touch sensor configured to detect deformation of the garnish, the touch sensor including touch sensor wires connecting to a control system of the vehicle.

9 Claims, 13 Drawing Sheets

(56) References Cited

U.S. PATENT DOCUMENTS

| | | | |
|---|---|---|---|
| 2017/0282979 A1* | 10/2017 | Singer | B62D 21/14 |
| 2018/0274269 A1* | 9/2018 | Orihara et al. | E05B 81/77 |
| 2020/0141171 A1* | 5/2020 | Ghannam et al. | B60Q 1/50 |
| 2020/0198422 A1 | 6/2020 | Niedert et al. | |
| 2020/0362617 A1* | 11/2020 | Williams et al. | E05F 15/42 |
| 2021/0001763 A1 | 1/2021 | Soonthornwinate | |
| 2021/0025216 A1* | 1/2021 | Salter et al. | B62D 33/0273 |
| 2021/0039722 A1* | 2/2021 | Williamson et al. | B62D 33/0273 |
| 2021/0246708 A1* | 8/2021 | Mönig et al. | B62D 33/0273 |
| 2021/0324671 A1* | 10/2021 | Ikeda et al. | H03K 17/962 |
| 2021/0354537 A1* | 11/2021 | Kneifl et al. | B60J 7/1204 |
| 2022/0065020 A1* | 3/2022 | Carter et al. | B60Q 3/30 |
| 2022/0212603 A1* | 7/2022 | Castro et al. | B60R 1/00 |
| 2022/0246366 A1* | 8/2022 | Osaki et al. | E05F 15/44 |
| 2022/0251893 A1* | 8/2022 | Komaromi et al. | B62D 33/0273 |
| 2022/0316257 A1* | 10/2022 | Kang et al. | E05F 15/77 |
| 2022/0316258 A1* | 10/2022 | Pulikonda et al. | E05F 15/70 |
| 2022/0381071 A1* | 12/2022 | Heins et al. | E05B 85/243 |
| 2023/0061847 A1* | 3/2023 | Silva | E05F 15/00 |

\* cited by examiner

POWER TAILGATE CARGO LOAD SENSOR

FIELD OF THE DISCLOSURE

This disclosure relates generally to vehicles and, more particularly, to a method of detecting load on a tailgate by a touch sensor located under part of the tailgate in a vehicle.

BACKGROUND

The "background" description provided herein is for generally presenting the context of the disclosure.

Vehicle sensors are used to detect obstructions mostly when closing a sliding door or a liftgate of a vehicle for safety reasons. These vehicle sensors are usually exposed to vehicle interiors only and these vehicle sensors can easily be damaged by exterior objects. Therefore, an improvement of vehicle sensor assemblies is needed.

SUMMARY

A vehicle tailgate structure of a vehicle is disclosed. The vehicle tailgate structure may include a power tailgate located at the rear of the vehicle; a garnish covering a top surface of the tailgate and configured to deform when an external load applies on the garnish, the garnish including a plurality of rib structures along an interior surface of the garnish and a screw portion including the garnish around a screw of the screw portion; and a touch sensor extending along the top surface of the tailgate and covered by the garnish, the touch sensor configured to detect deformation of the garnish, the touch sensor including touch sensor wires connecting to a control system of the vehicle.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure will be described in detail with reference to the following figures.

The figures are not to scale. In general, the same reference numbers will be used throughout the drawing(s) and accompanying written description to refer to the same or like parts.

DETAILED DESCRIPTION

The description set forth below in connection with the appended drawings is intended as a description of various aspects of the disclosed subject matter and is not necessarily intended to limit any aspect. In certain instances, the description includes specific details for providing an understanding of the disclosed subject matter. However, it will be apparent to those skilled in the art that aspects may be practiced without these specific details. In some instances, well-known structures and components may be shown in block diagram form to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Figure 1:
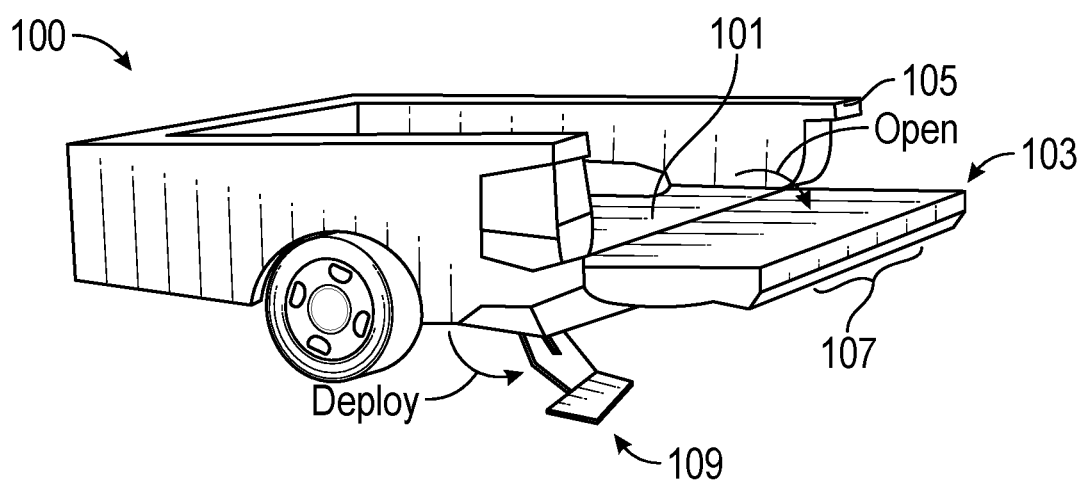
FIG. 1 is a perspective view of a vehicle having a tailgate, in accordance with the teachings of this disclosure.

FIG. 1 illustrates a vehicle having a tailgate 103 at an end of a truck bed 101. A tailgate handle 107 is provided on the tailgate 103 to operate a tailgate latch 105. When the tailgate handle 107 is operated the tailgate latch 107 releases the tailgate 103 from the truck bed 101, allowing the tailgate 103 to rotate to a closed position to an open position. A motor-operated occupant step 109 may be independently deployed with respect to the tailgate 103. The tailgate 103 and the occupant step 109 may operate independently of each other with regard to their opening and closing range of motion and travel paths. The tailgate 103 may be also be operated by a remote, gesture, or other electronic methods.

In the current disclosure, in a case when a load or an object is detected on the tailgate 103, a vehicle controller or an electronic control unit (ECU) of the vehicle 100 for the tailgate 103 may prevent the tailgate 103 from being opened. The load or the object may be, but not limited to, building materials, a person, furniture, or the like.

In the current disclosure, a touch sensor for detecting the load or the object on the tailgate 103 may be provided, which will be discussed in detail later. The touch sensor may be placed under a top protector or garnish 305 of the tailgate 103 to detect the load or the object. If the load or the object is detected, then the ECU or the vehicle controller may prevent the tailgate from being opened.

Figure 2:
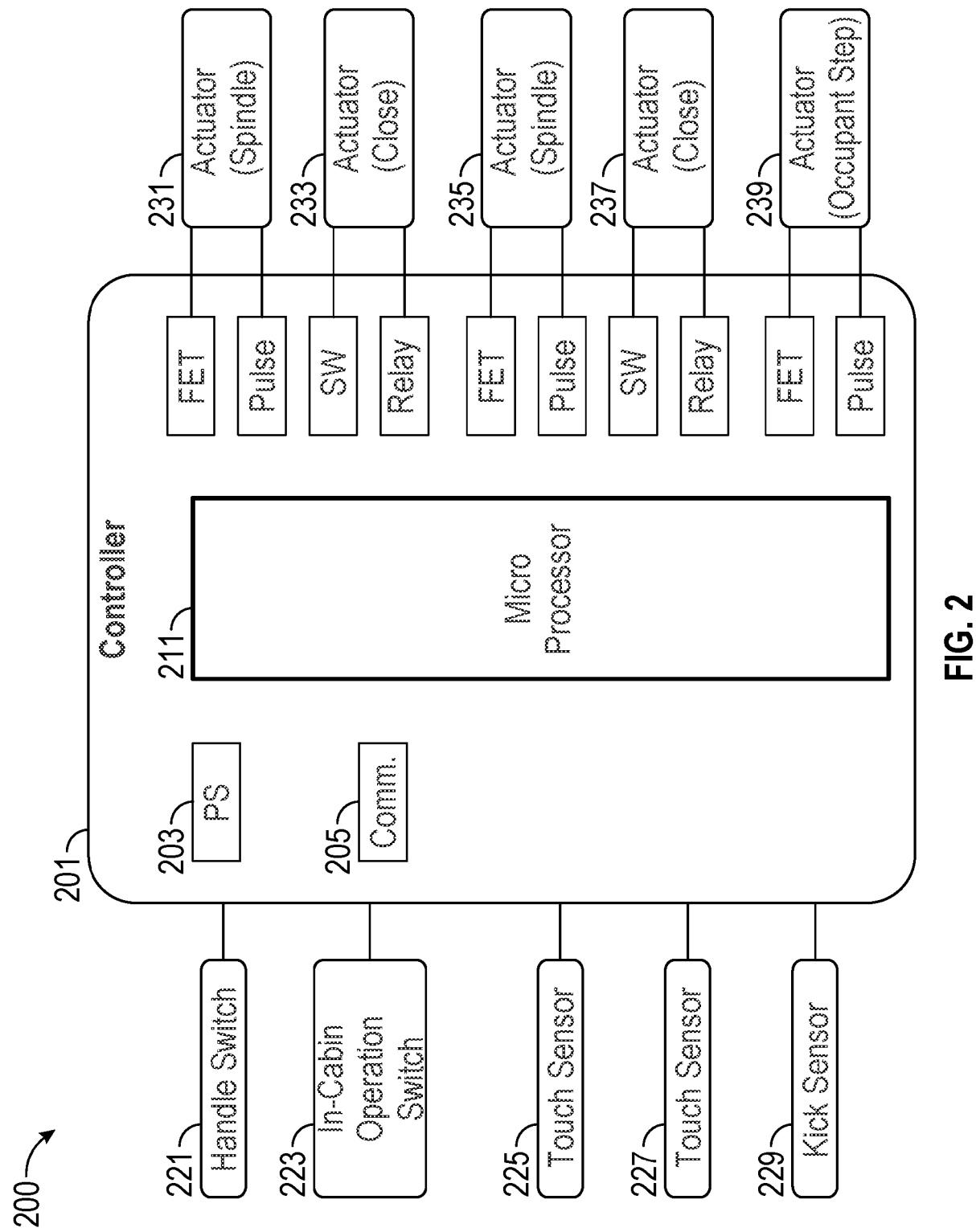
FIG. 2 is a block diagram of a control system, in accordance with the teachings of this disclosure.

FIG. 2 is a block diagram of a control system in accordance with an exemplary aspect of the disclosure. The drawing is for purposes of explaining a basic controller and is nonlimiting.

The control system 200 may include a controller 201 (ECU) having a micro-processor 211 implemented as processing circuitry. The controller 201 may include a power supply 203 and a communications circuit 205 for interfacing with other controllers in the vehicle and/or other external control devices. The controller 201 may include one or more digital and/or analog interfaces for sensors, providing input signals to the controller 201. The controller 201 may include specialized circuits and relays providing output control signals for control of actuators.

The micro-processor 211 may be an integrated circuit board having a processing chip, memory modules and I/O interfaces. The micro-processor 211 may include a security chip and other specialized processing devices such as a math co-processor. Memory modules may include Read Only Memory (ROM), Random Access Memory (RAM) and variants of nonvolatile and volatile memory. In the case of a security chip, the security chip may have a dedicated secure memory. Any or all of the processors may include one or more processor cores.

Types of sensors may include a handle switch 221, an in-cabin operation switch 223, touch sensors 225, 227, and a kick sensor 229. The control system 200 is not limited to the sensors depicted in the drawing. For example, there may be several handle switches 221 and in-cabin operation switches 223 depending on the arrangement of the vehicle. The number and arrangement of touch sensors 225, 227 are dependent on the size and configuration of a touch surface or various touch surfaces on the vehicle. There may be several different kick sensors, each of different type and arrangement, or similar sensors at different locations. In addition, the controller 201 may receive signals from other types of sensors depending on the configuration of a vehicle.

Types of actuators may include actuators for small motors that can perform operations such as open and close doors or lift gates. An actuator for a motor may rotate a spindle. An aspect is an actuator that rotates a spindle 231 that moves a door or tailgate to an opened position. The spindle actuator 231 may be controlled to stop operation of opening the door or tailgate at a position that is between fully closed or fully opened upon detection of an opposing force. In some embodiments an opposing force may be determined by detection of a predetermined torque on the respective motor spindle. The opposing force may be encountered when the door or tailgate comes into contact with a person or some other object and the person or other object is either not movable, or pushes back against the door or tailgate. There may be any number of actuators, e.g., close actuator 233, spindle actuator 235, and close actuator 237, depending on the arrangement of doors and tailgate for a vehicle.

In an embodiment, as described earlier, the touch sensors 225, 227 in the control system 200 may be used for detecting the load or the object on the tailgate 103.

Figure 3:
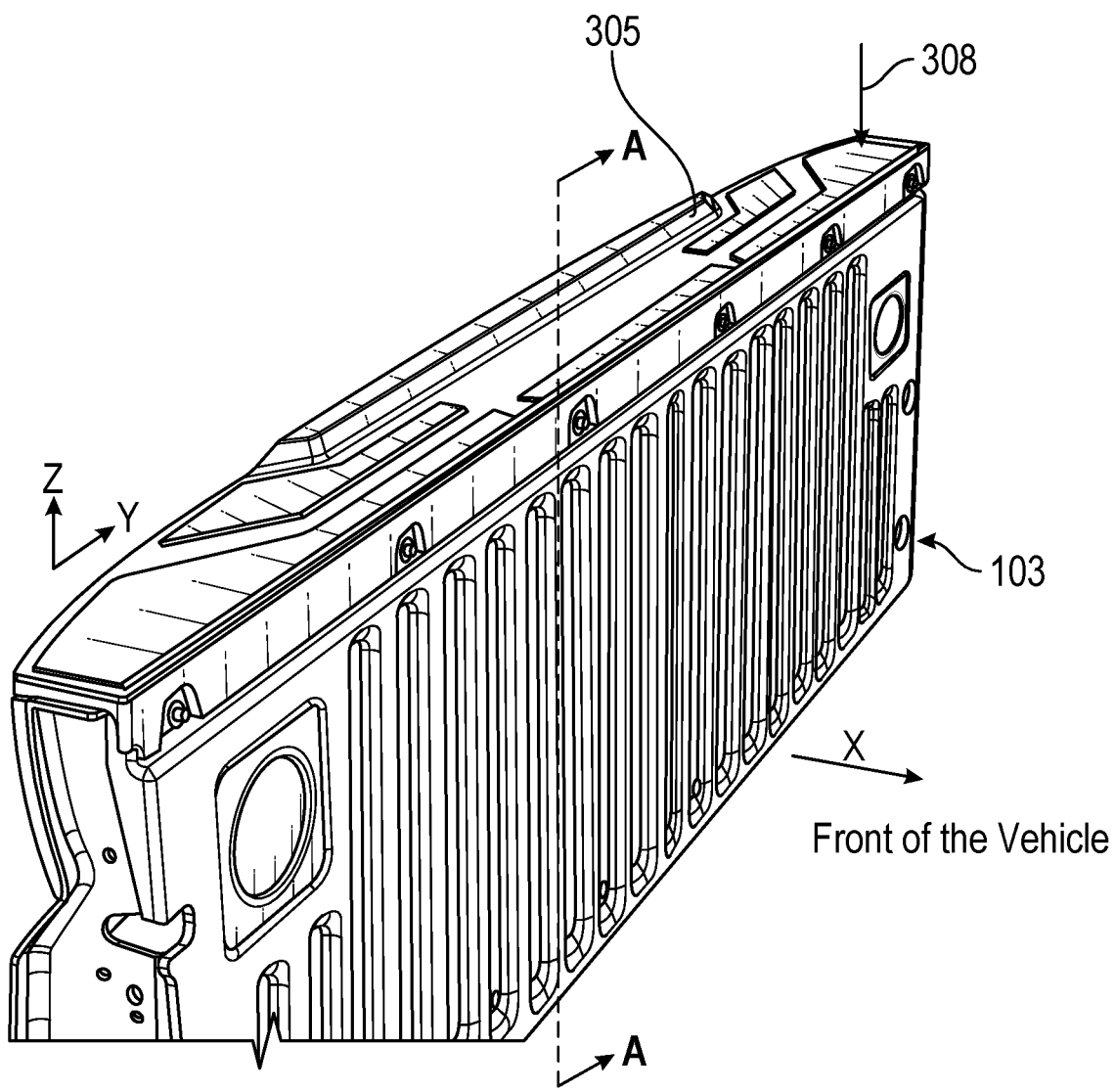
FIG. 3 is a right perspective view of a tailgate of a vehicle, in accordance with the teachings of this disclosure.

FIG. 3 a right perspective view of the tailgate 103 of a vehicle in accordance with the teachings of this disclosure. The front of the vehicle is on the right of FIG. 3. A tailgate assembly includes the tailgate 103, a touch sensor 304 (FIG. 4), and a garnish 305. The garnish 305 extends along a top surface of the tailgate 103 and provides a protective and decorative function. The tailgate 103 may be located at the rear of the truck bed 103. The tailgate 103 may be used for loading or unloading heavy freight at locations without docks and forklifts. The tailgate 103 may be able to be opened and closed. The open position having an inner surface of the tailgate 103 substantially in line with the truck bed 101. The control system 200 may be able to control the opening of the tailgate 103 by use of the spindle actuator 231. The tailgate 103 may be made of, but not limited to, aluminum, steel, or the like. The material of the tailgate 103 may be different from the materials of the vehicle, the motors of the vehicle, and latches of the vehicle, to offset a total weight of the whole vehicle.

The garnish 305 may be a protector to make loading and unloading items from the truck bed easier. The garnish 305 may protect the tailgate 103 from scratches and rust. The garnish 305 may be made of, but not limited to, plastic, polypropylene, or the like. The garnish 305 may be lightweight and resistant to heat, fatigue, and most organic solvents. In some embodiments, the garnish may have insulating properties.

The touch sensor 304 (FIG. 4) may be placed under the garnish 305 in FIG. 3 to detect a load 308 on the garnish 305. The load 308 may be a plywood, wooden boards, or the like, and the load 308 is applied on the garnish 305. The load 308 may be furniture on the garnish 305. The load 308 may have a magnitude and direction downward to allow the touch sensor 304 to contact a sensor trigger location 312 (FIG. 5) on an inner surface of the garnish 305. When the load 308 is detected, the control system 200 may prevent the tailgate 103 from being opened. For example, the control system 200 may determines if the load 308 is resting on the tailgate 103 or the garnish 305 using the touch sensor 304. If the load 308 is detected, then the control system 200 may not allow the opening of the tailgate 103 by restricting the use of the spindle actuator 231.

Figure 4:
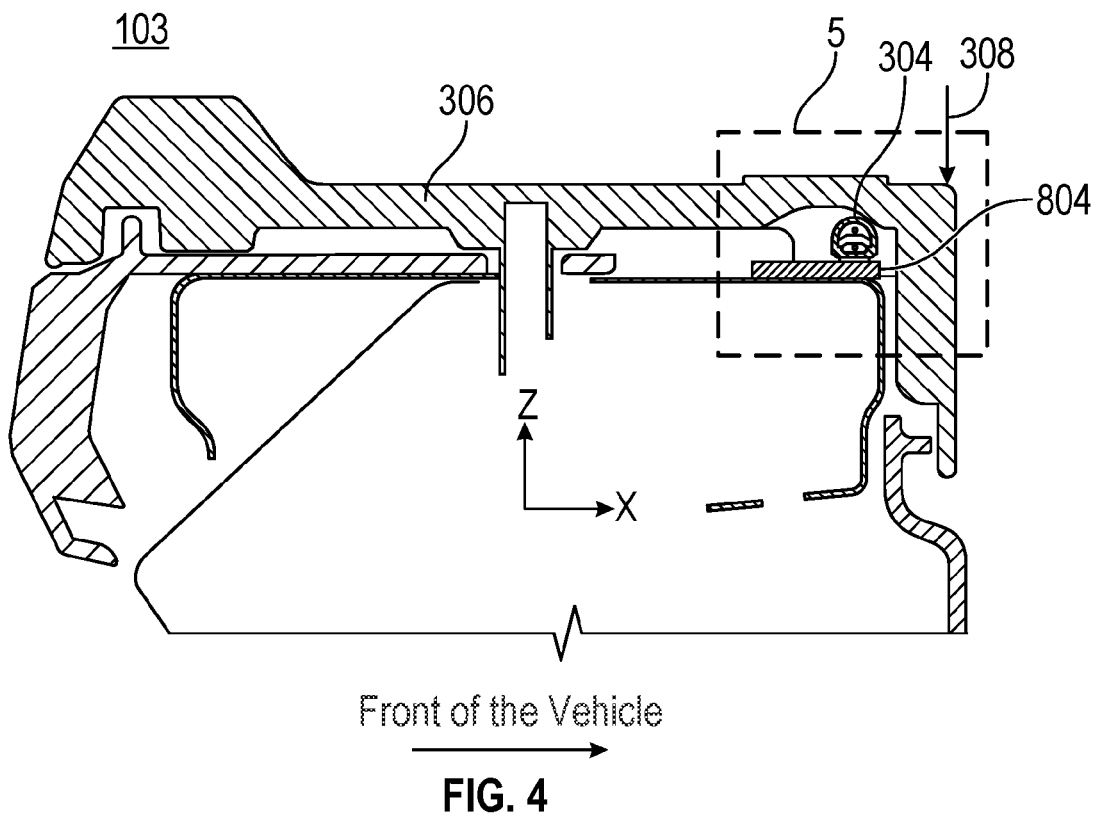
FIG. 4 is a side sectional view of a tailgate of a vehicle cut along A-A in FIG. 3, in accordance with the teachings of this disclosure.

FIG. 4 is a side sectional view of the tailgate 103 of a vehicle cut along A-A of FIG. 3 in accordance with the teachings of this disclosure. The front of the vehicle is on the right of FIG. 4. As mentioned earlier, the tailgate assembly includes the tailgate 103, the touch sensor 304, and the garnish 305. The control system 200 may be able to control the folding of the tailgate 103. The touch sensor 304 may be hidden from exterior view or exterior access by garnish 305. The touch sensor 304 may be able to detect the load 308 as shown in FIG. 3 on an exterior panel for preventing the truck tailgate door from opening. A bracket 804 may support a bottom of the touch sensor 304, which will be discussed in FIG. 8. The area in FIG. 4 with a dashed box 5 is further described in FIG. 5.

Figure 5:
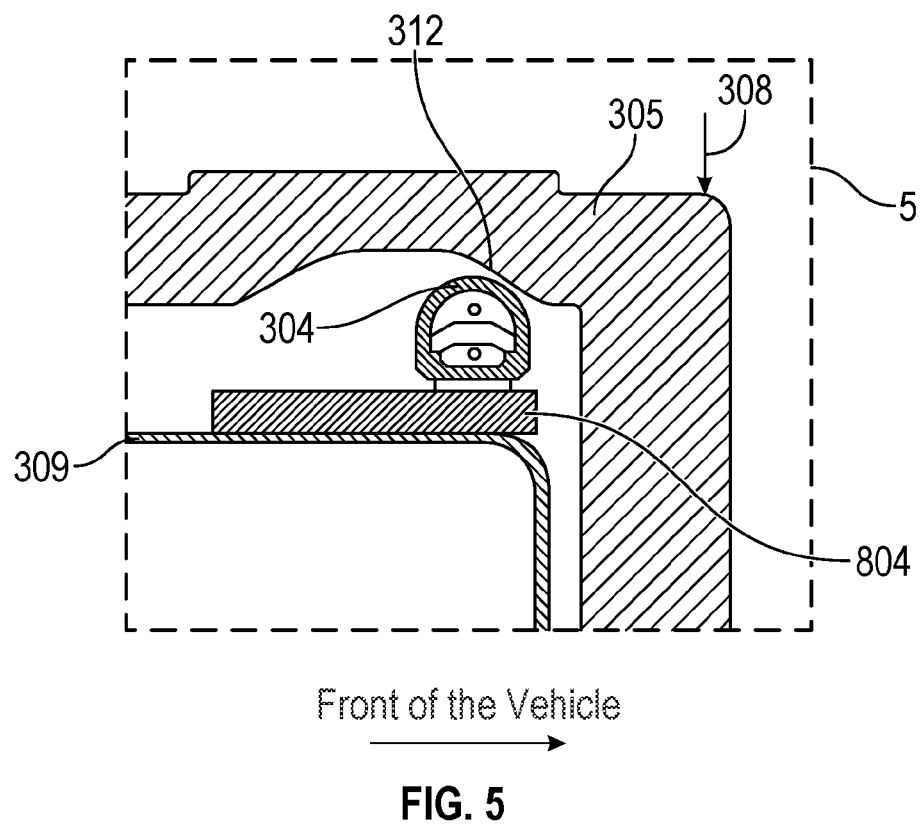
FIG. 5 is an enlarged view of the area in FIG. 4 with the dashed box, in accordance with the teachings of this disclosure.

FIG. 5 is an enlarged view of the area in FIG. 4 with the dashed box 5 in accordance with the teachings of this disclosure. FIG. 5 shows additional detail of the tailgate assembly including the touch sensor 304, and the garnish 305. The bracket 804 is also shown in FIG. 5 and the bracket 804 supports the touch sensor 304. The bracket 804 is mounted to tailgate frame 309. The bracket 804 provided between the tailgate frame 309 and the touch sensor 304. A deflection of the garnish 305 may trigger the touch sensor 304. Further, the control system 200 may prevent the tailgate 103 from being opened due to the trigger of the touch sensor 304. For example, when a load 308 such as a cargo load rests on the garnish 305, it deflects the garnish 305 at the sensor trigger location 312. The deflection of the garnish 305 further triggers the touch sensor 304. Therefore, the touch sensor 304 may transmit the signal to the control system 200 to indicate that the load 308 is on the tailgate 103 or the garnish 305. The control system 200 may further determine that the tailgate 103 may not be opened.

Figure 6:
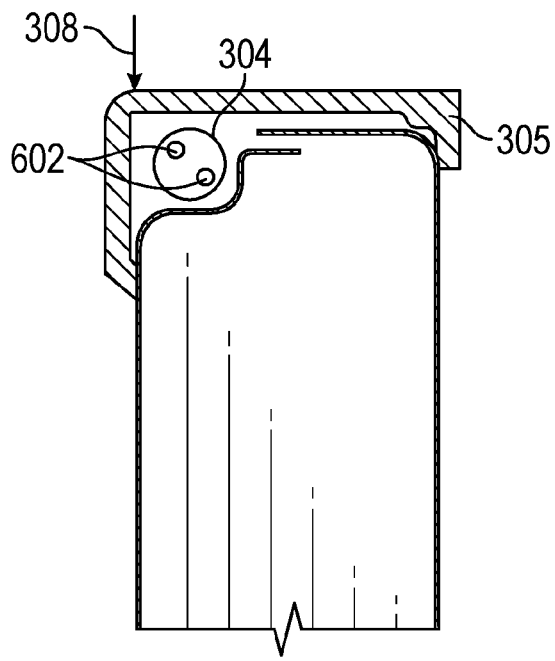
FIG. 6 shows a touch sensor in the tailgate, in accordance with the teachings of this disclosure.

FIG. 6 shows a touch sensor 304 in the tailgate 103, in accordance with the teachings of this disclosure.

The garnish 305 is on an upper surface of the tailgate 103 to protect the tailgate 103. The touch sensor 304 may be under the garnish 305. The touch sensor 304 may include touch sensor wires 602. The touch sensor wires 602 may be connected to the control system 200 (FIG. 2). The shape of the touch sensor 304 may be, but not limited to, a circle or a square.

The external load 308 may be plywood, wooden boards, or the like, and the load 308 is applied on the garnish 305. When the external load 308 is detected, the control system 200 (FIG. 2) may prevent the tailgate 103 from being opened. In addition, when the external load 308 is detected by the touch sensor 304, it may trigger the touch sensor wires 602 to communicate with the control system 200. As mentioned earlier, the control system 200 may determine that the tailgate 103 should be closed when the external load 308 is present on the garnish 305.

Figure 7:
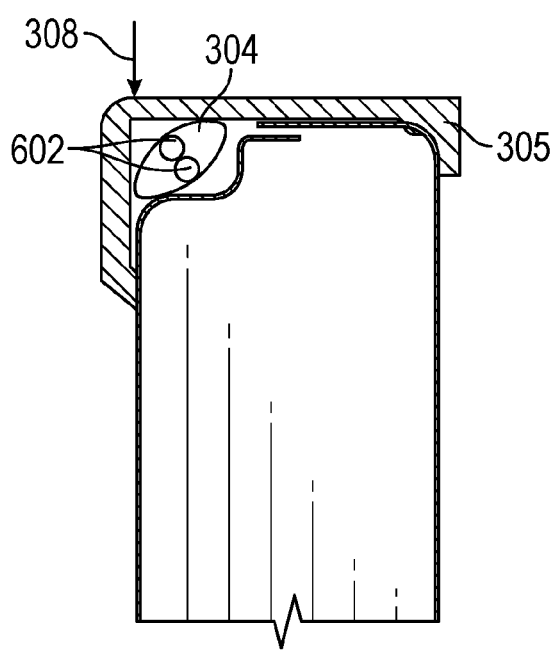
FIG. 7 shows a deflection of the touch sensor in the tailgate, in accordance with the teachings of this disclosure.

FIG. 7 shows a deflection of the touch sensor 304 in the tailgate 103, in accordance with the teachings of this disclosure. Similar to the description in FIG. 6, the garnish 305 of FIG. 7 surrounds the tailgate 103 to protect the tailgate 103. The touch sensor 304 may be under the garnish 305. The touch sensor 304 may include touch sensor wires 602. The touch sensor wires 602 may be connected to the control system 200 mentioned earlier in FIG. 2.

The shape of the touch sensor 304 in FIG. 6 may have a circular cross-section but is not so limited. After the external load 308 rests on the garnish 305, the garnish 305 may be rotated or deflected. The rotation or the deflection of the garnish 305 may also deform or deflect the touch sensor 304 due to contact with the garnish 305. The cross-section of the touch sensor 304 is exaggerated in FIG. 7 to illustrate the deformation or deflection of the touch sensor 304 to cause the sensor wires 602 to contact and therefore 602 to be in a closed circuit. As discussed earlier, the touch sensor 304 and the touch sensor wires 602 may communicate with the control system 200 mentioned earlier in FIG. 2. Therefore, when the external load 308 is detected by the touch sensor 304, it may trigger the touch sensor wires 602 to communicate with the control systems 200. The control system 200 may determine that the tailgate 103 should remain closed when the external load 308 is present on the garnish 305.

In some aspects, the touch sensor 304 can detect a resistance value of the touch sensor wires 602. The resistance value varying with response to a load applied to the touch sensor 304. Using a predetermined resistance value within the circuit, a travel amount of the garnish 305 can be determined by measuring the change in the resistance value. The internal resistance of the unloaded touch sensor 304 can be, for example, 4700 Ω. When the internal resistance of the touch sensor 304 drops below a threshold value (e.g. 500 Ω), due to pressure on the touch sensor causing the internal resistance to drop, the ECU can determine that the tailgate 103 is not allowed to unlock and/or open. This determination of the internal resistance of the touch sensor 304 being below the threshold value is an example of a determined or detected actuation event of the touch sensor 304.

Figure 8:
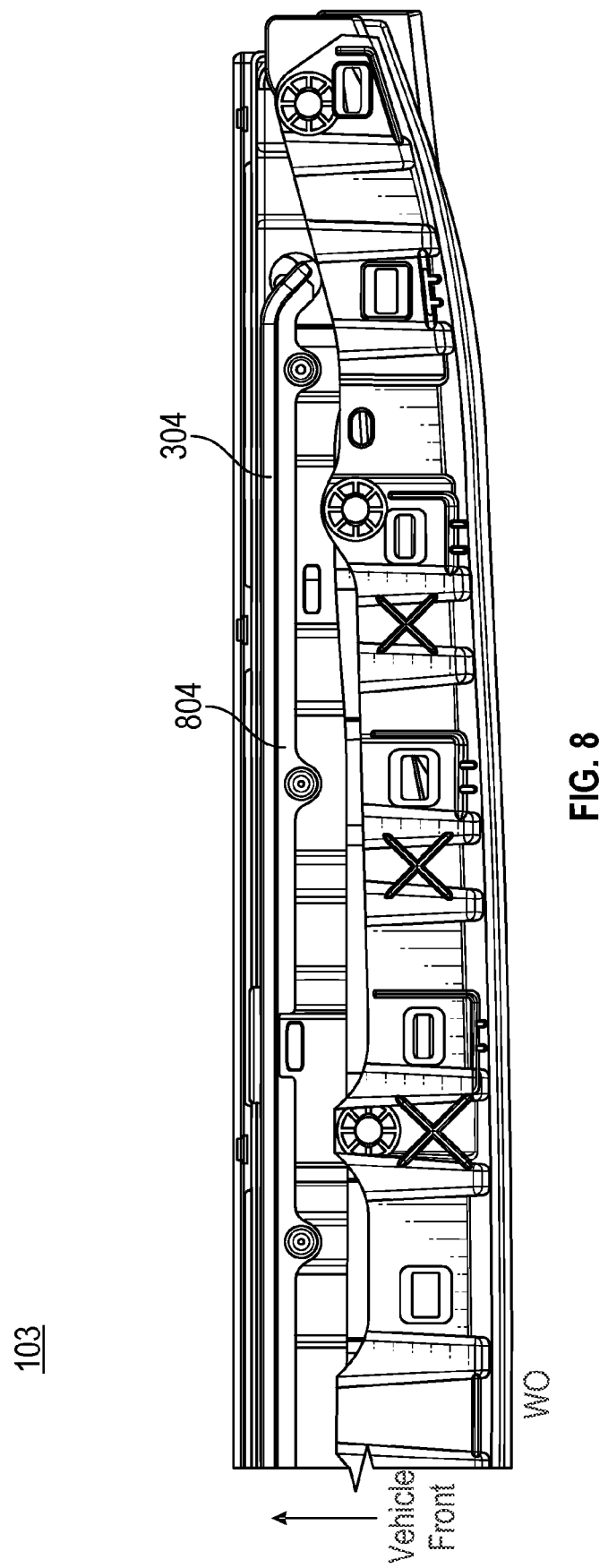
FIG. 8 is a top view of a tailgate when the tailgate is open, in accordance with the teachings of this disclosure.

FIG. 8 is a top view of the top surface of the tailgate 103, in accordance with the teachings of this disclosure.

In an embodiment, a direction to the top of FIG. 8 is the vehicle front. The touch sensor 304 is extending along the bracket 804. The bracket 804 may be made of, but not limited to, a metal, a plastic, or the like. The shape of the bracket 804 may be adjusted according to the shape of the tailgate 103, the touch sensor 304, or the garnish 305.

Figure 9:
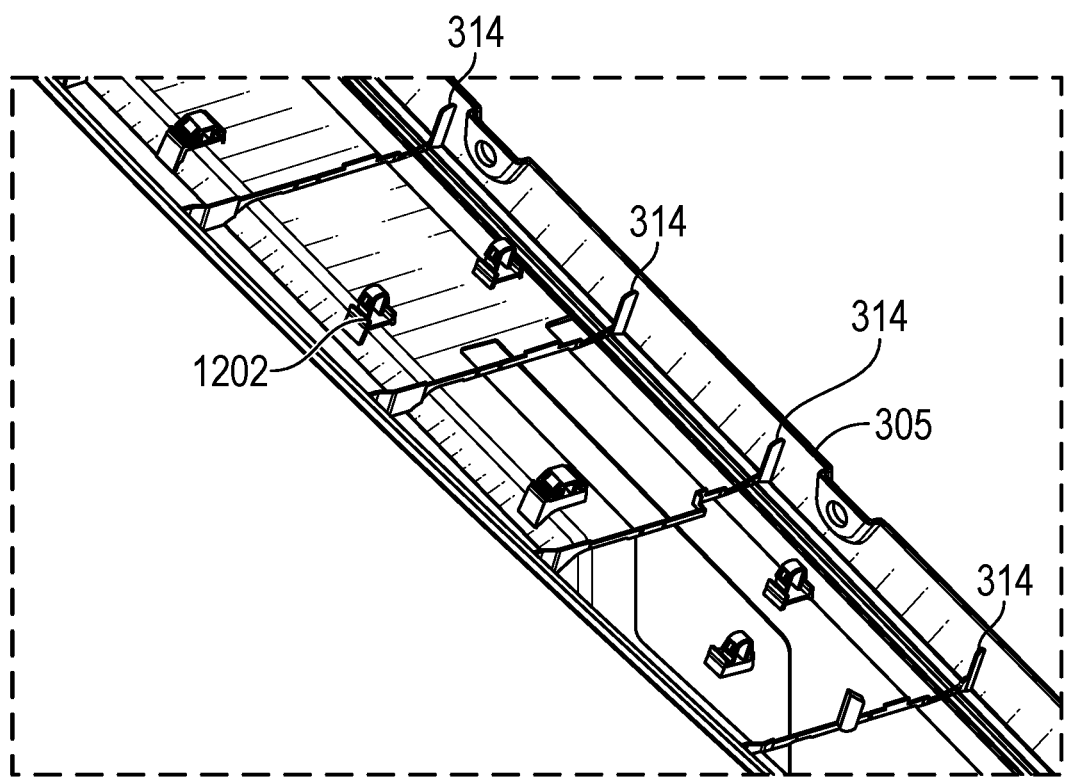
FIG. 9 is a perspective an underside view of the garnish 305, in accordance with the teachings of this disclosure.

FIG. 9 is a perspective an underside view of the garnish 305. The garnish 305 in FIG. 9 includes a plurality of the rib structures 314. Standoff portions 1202 are also shown in FIG. 9, which will be discussed with respect to FIG. 12. The rib structures 314 may be spaced apart to contact the touch sensor 304 at specific locations as shown in FIG. 9. As discussed earlier, after the external load 308 rests on the garnish 305 may deflect and contact the touch sensor 304. Specifically, when the garnish 305 deflects, the rib structures 314 contact the touch sensor 304. The deflection of the garnish 305 may also deform the touch sensor 304 into a different shape such as an ellipse shown in FIG. 7 thereby forcing contact between the touch sensor wires 602. The deflection of the touch sensor 304 at those rib structures 314 may also cause the touch sensor wires 602 to be in a closed circuit. Therefore, when the external load 308 is detected by the touch sensor 304, it may trigger the touch sensor wires 602 to communicate with the control system 200. The control system 200 may determine that the tailgate 103 should remain closed when the external load 308 is present on the garnish 305.

Figure 10:
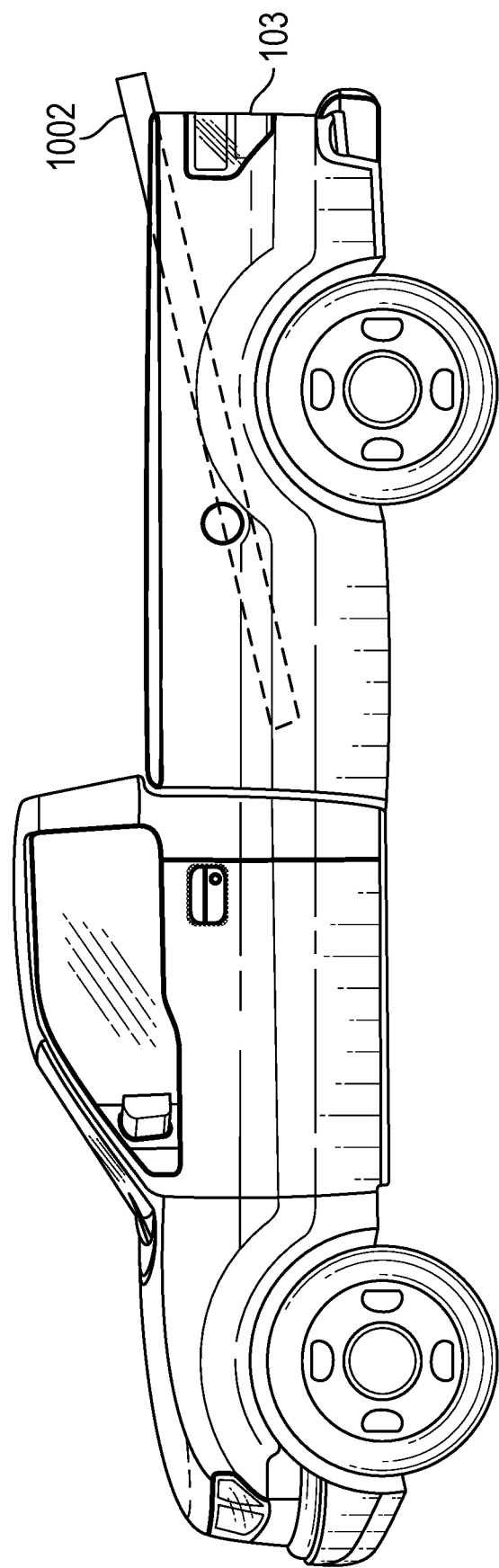
FIG. 10 is a vehicle side view with an example external load on the tailgate, in accordance with the teachings of this disclosure.
Figure 11:
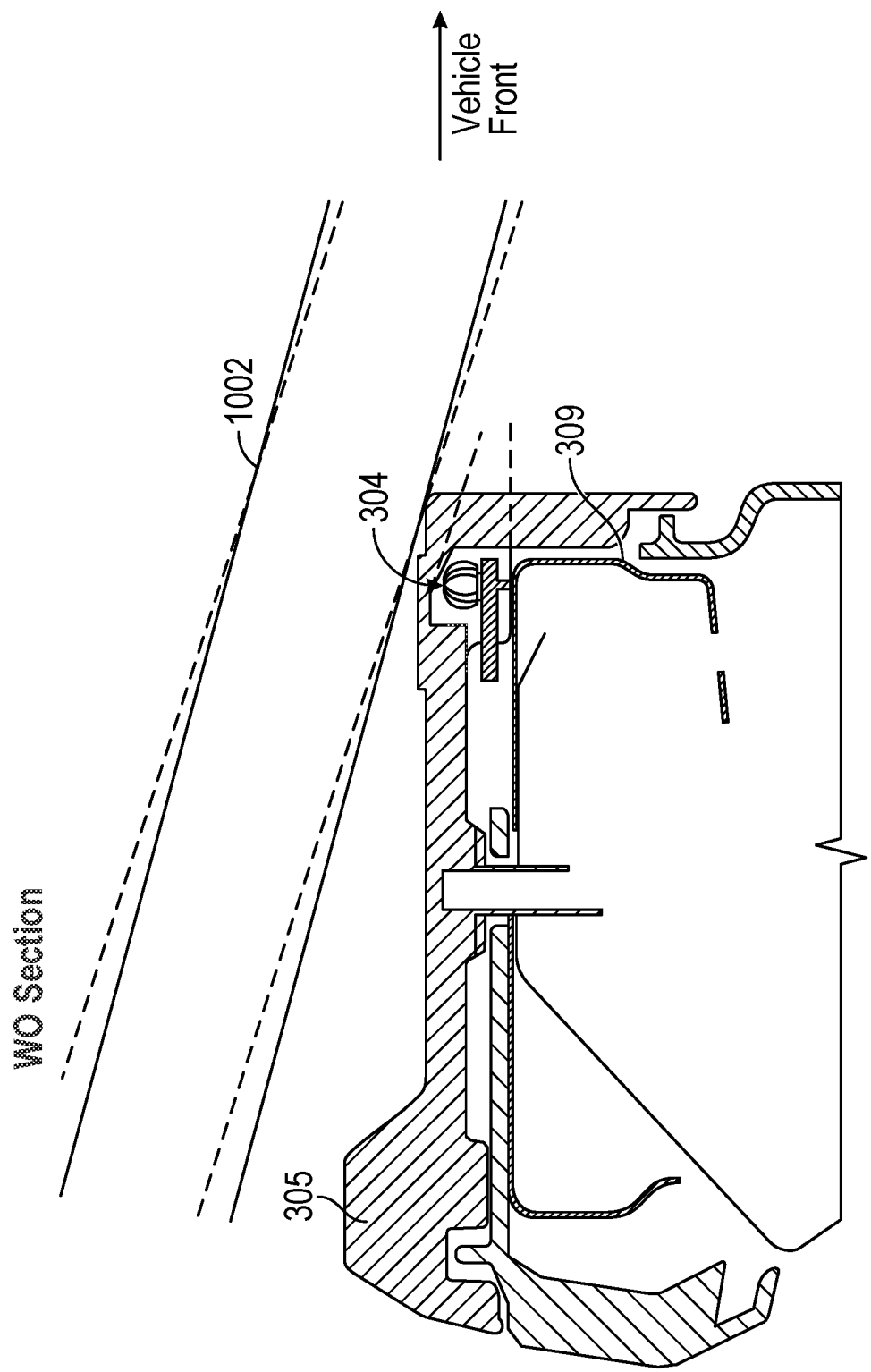
FIG. 11 is a side section cut view of the example external load on the tailgate, in accordance with the teachings of this disclosure.

FIG. 10 is a vehicle side view with an example external load on the tailgate 103, in accordance with the teachings of this disclosure. FIG. 11 is a perspective view of the example external load on the tailgate 103, in accordance with the teachings of this disclosure.

In an embodiment, the external load may be lumber 1002. The lumber 1002 may rest on the tailgate 103. As discussed earlier, the lumber 1002 resting on top of the tailgate 103 may deflect the garnish 305 of the vehicle. The deflected garnish 305 may deform the touch sensor 304, and further trigger the touch sensor wires 602 to communicate with the control system 200. The control system 200 may determine that the tailgate 103 should be closed when the lumber 1002 is present on the garnish 305.

Figure 12:
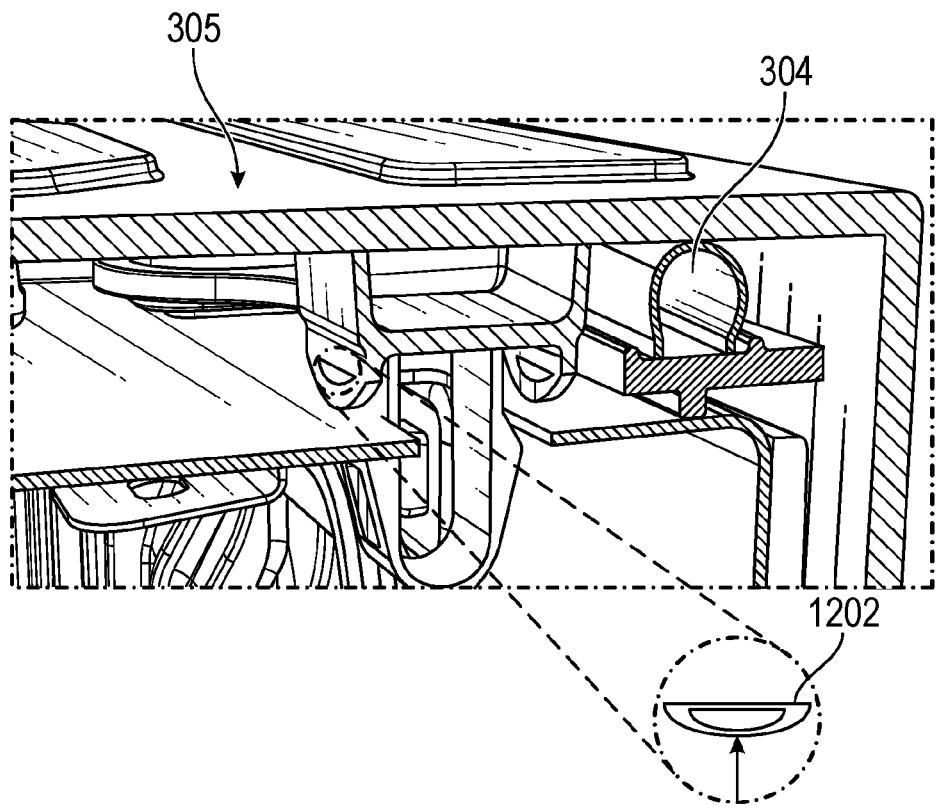
FIG. 12 is an example perspective section view of a first example garnish structure, in accordance with the teachings of this disclosure.

FIG. 12 is a first side view of a first example garnish structure, in accordance with the teachings of this disclosure.

In an embodiment, the garnish 305 may have a standoff portion 1202, the standoff portion 1202 on an underside surface of the garnish 305. The standoff portion may be modified to have a flexible spring shape. That is, the standoff portion has a shape or material that plastically deforms under load and returns to the original shape when the load is removed. The standoff portion 1202 may be used to bias the garnish 305 upwards against the external load 308. The standoff portion 1202 which includes the flexible spring shape may be sensitive to the deflection of the garnish 305 when the external load 308 is on the tailgate 103. The standoff portion 1202 may be able to be compressed under an external load (e.g. load 308). The standoff portion 1202 may expand when going from a loaded position to an unloaded position. The spring constant of the flexible spring shape of the standoff portion 1202 may be set so that a predetermined load will deflect the garnish 305 sufficiently to trigger the touch sensor 304.

Figure 13:
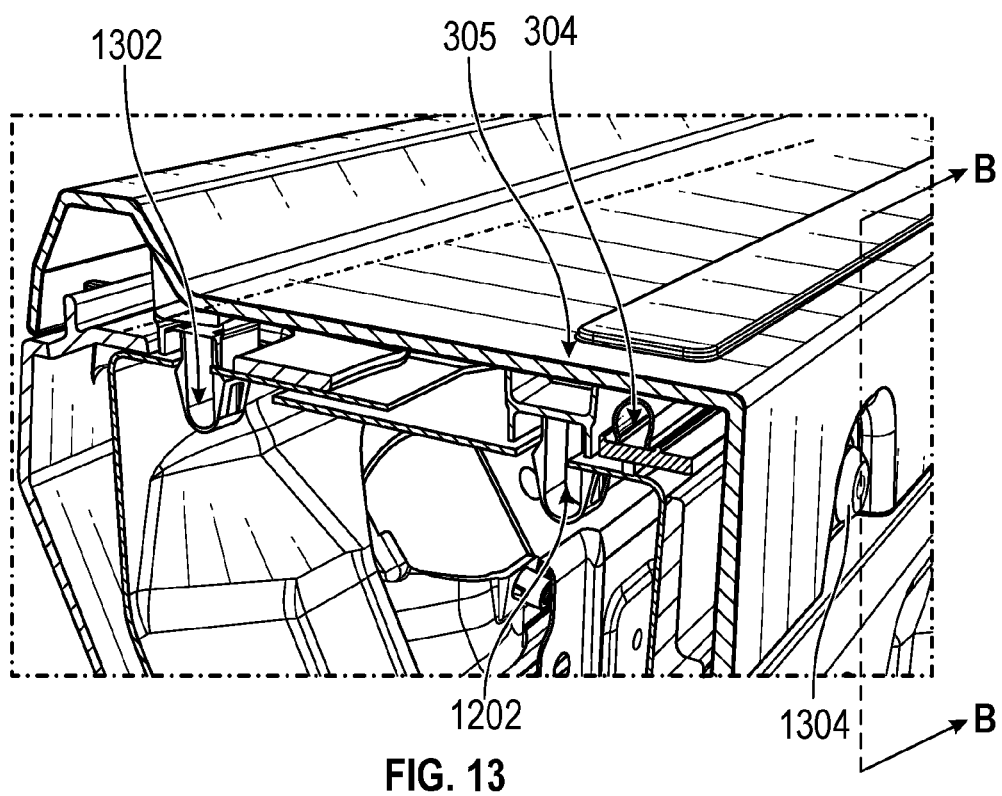
FIG. 13 is a second example perspective section view of the first example garnish structure, in accordance with the teachings of this disclosure.

FIG. 13 is a second side view of the first example garnish structure, in accordance with the teachings of this disclosure.

In FIG. 13, a second standoff portion 1302 is located at the rear of the garnish 305 of the tailgate 103. The front of the garnish 305 may have an ability to rotate around the second standoff portion 1302 since the second standoff portion 1302 is not flexible, which is different from the flexible spring shape of the standoff portion 1202. The first example garnish structure may also include a screw portion 1304. The screw portion 1304 may allow an actuation movement when the garnish 305 rotates. The screw portion 1304 may allow the garnish 305 to slide up and down relative to the screw portion, which will be shown in FIG. 14.

Figure 14:
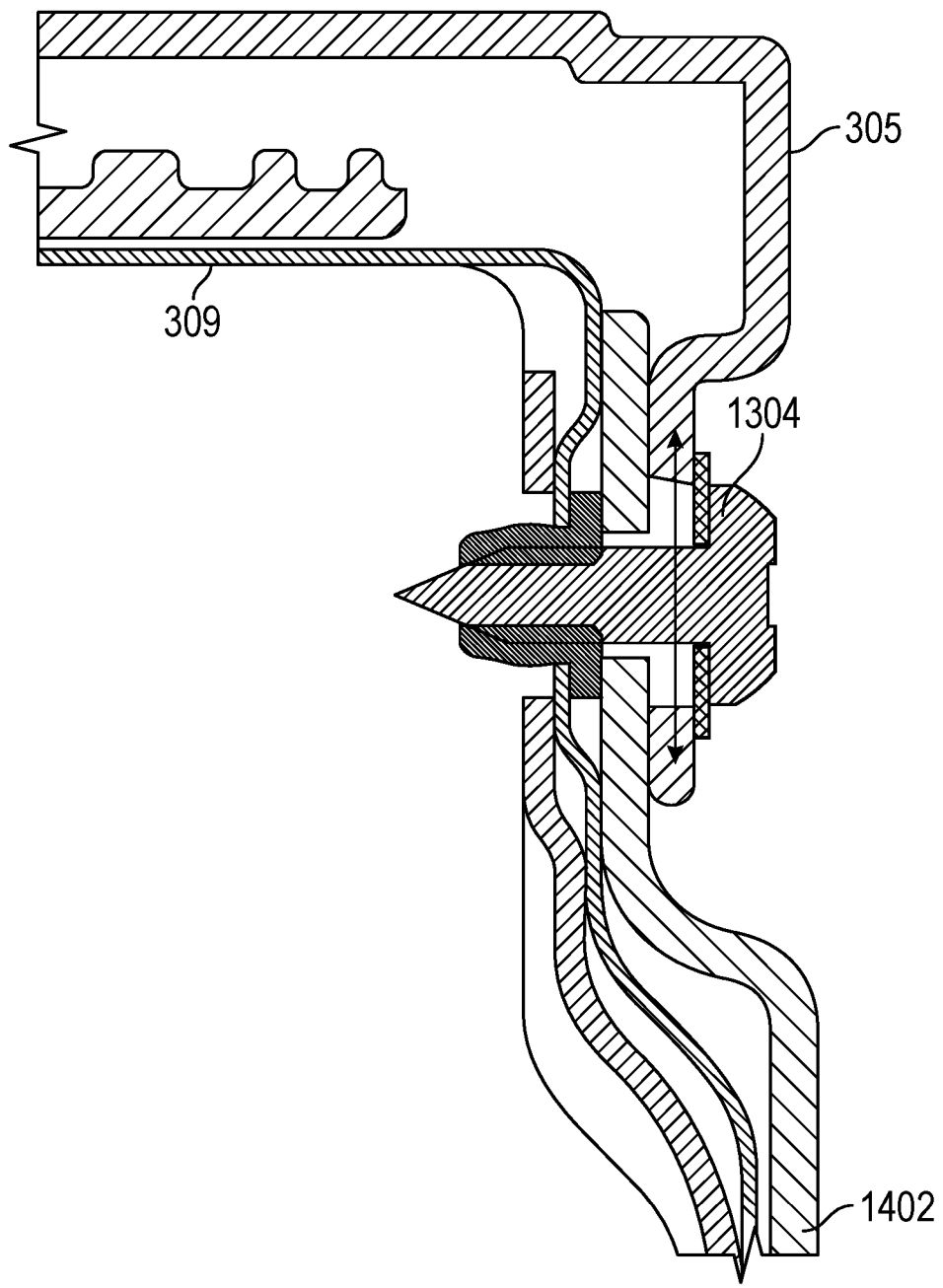
FIG. 14 is an enlarged side section view of the screw portion of the first example garnish structure from FIG. 13 along B-B in the example garnish structure, in accordance with the teachings of this disclosure.

FIG. 14 is an enlarged view of the screw portion 1304 in the first example garnish structure, in accordance with the teachings of this disclosure. Here, the screw portion 1304 penetrates the garnish 305, tailgate cover 1402 and the tailgate frame 309.

In an embodiment, the size of the screw of the screw portion 1304 is smaller than the diameter of the opening of the garnish 305 so that the screw portion 1304 can move within the opening. Accordingly, the garnish 305 near the screw portion 1304 may move up and down depending on the external load 308 applied on the garnish 305.

Figure 15:
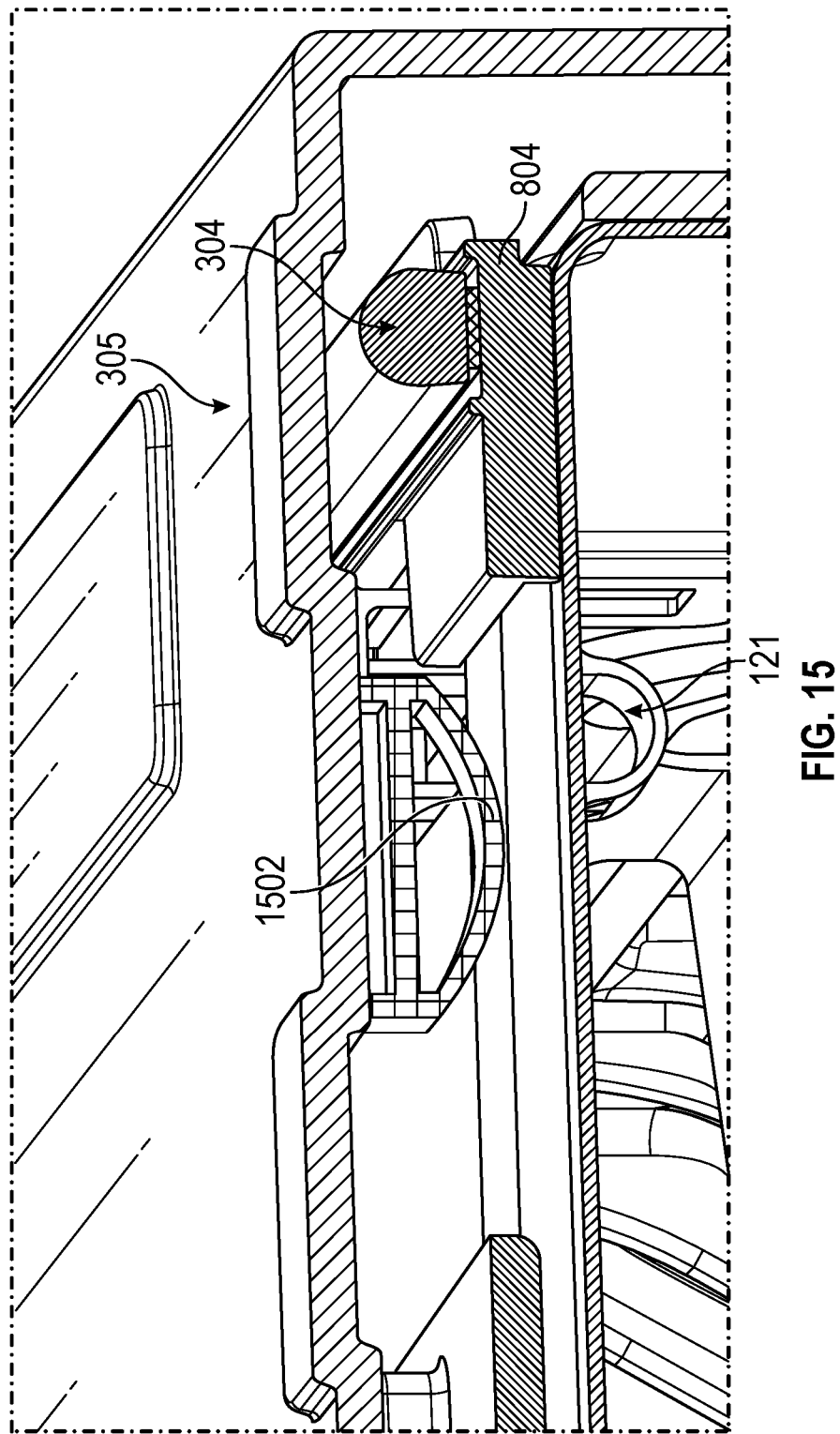
FIG. 15 is a perspective side view of a second example garnish structure, in accordance with the teachings of this disclosure.

FIG. 15 is a side view of a second example garnish structure, in accordance with the teachings of this disclosure. The second example garnish structure includes a second flexible spring structure. FIG. 15 includes a standoff portion 1502 which is shorter and placed at an alternate location relative to the standoff portion 1202 (see also FIG. 12). The second flexible spring structure may be used to increase a sensitivity of the external load on the garnish 305 in the vehicle. That is, the standoff portion 1502 and the standoff portion 1202 can have different spring rates and work progressively. In some embodiments, the second flexible spring structure may be used to reset the position of the garnish 305 after the external load 308 is removed from the garnish 305.

Figure 16:
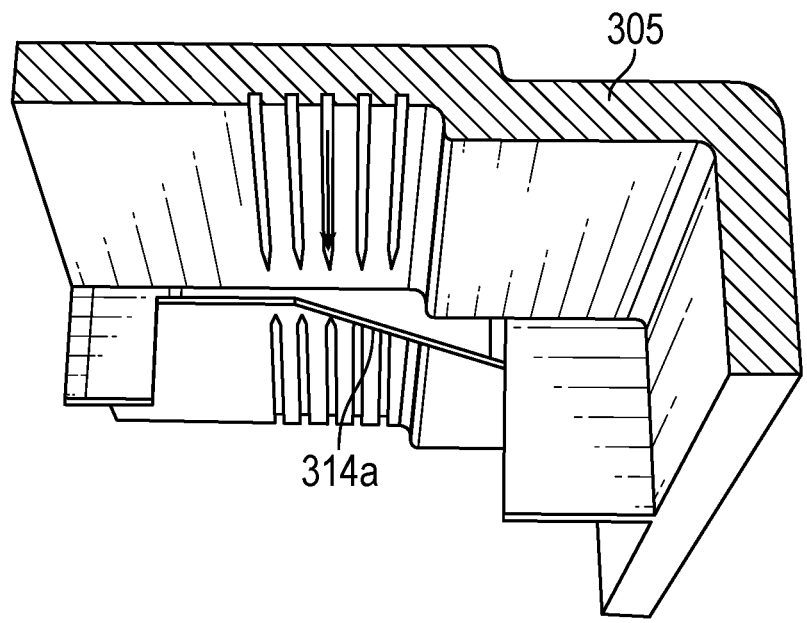
FIG. 16 is a perspective view of one example of the rib structures.

FIG. 16 is a perspective view of one example of the rib structures. An underside perspective of garnish 305 is shown including a wedge-shaped rib structure 314*a*. The shape of the rib structure 314 can varying depending upon the design of the garnish 305 and the type, direction, and amount of deflection the garnish 305 has under load. If the garnish 305 is designed to rotate around a rearward pivot point, the wedge-shaped rib structure 314*a* may be used to allow greater contact with the touch sensor 304 during the rotating movement of the garnish 305.

Figure 17:
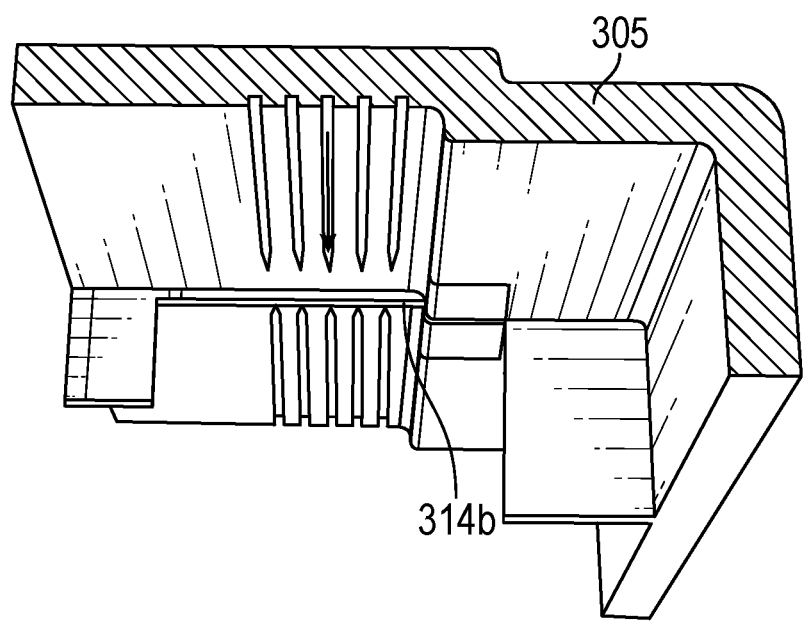
FIG. 17 is a perspective view of another example of the rib structures.

FIG. 17 is a perspective view of another example of the rib structures. An underside perspective of garnish 305 is shown including a straight rib structure 314*b*. If the garnish 305 to move in a vertical direction under load, as discussed above with regard to FIG. 12 to FIG. 14, then the straight rib structure 314*b* arranged horizontally to the touch sensor 314 may be used to allow greater contact with the touch sensor 304 during the vertical movement of the garnish 305.

Although certain example apparatus, systems, and methods have been disclosed herein, the scope of coverage of this patent is not limited thereto. Obviously, numerous modifications and variations are possible considering the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle tailgate structure of a vehicle, comprising:
   a tailgate located at a rear of the vehicle;
   a garnish covering a top surface of the tailgate and configured to rotate when an external load is applied to the garnish, the garnish including a rib structure along an interior surface of the garnish; and
   a touch sensor extending along the top surface of the tailgate and covered by the garnish, the touch sensor configured to detect an actuation event due to movement of the garnish, the touch sensor including touch sensor wires connected to a control system of the vehicle.

2. The structure of claim 1, wherein a first standoff portion extends from the interior surface of the garnish and is configured to contact the top surface of the tailgate.

3. The structure of claim 2, wherein a second standoff portion extends from the interior surface of the garnish and is configured to contact the top surface of the tailgate, the second standoff portion including a plurality of first flexible springs.

4. The structure of claim 3, wherein a second flexible spring structure is adjacent to the second standoff portion.

5. The structure of claim 4, wherein the plurality of first flexible springs of the second standoff portion deforms when the external load is applied to the garnish.

6. The structure of claim 1, wherein the control system controls a movement of the tailgate by a processing circuitry.

7. The structure of claim 1, wherein the rib structure is one of a plurality of rib structures of the garnish are arranged periodically along a length of the touch sensor.

8. The structure of claim 1, further comprising:
   a screw that attaches the garnish to a side surface of the tailgate, the garnish is configured to move vertically relative to the screw when the external load is applied to the garnish.

9. The structure of claim 1, wherein the touch sensor is configured to deflect due to contact with the rib structure of the garnish.

* * * * *